(12) United States Patent
Bornemann et al.

(10) Patent No.: US 11,964,648 B2
(45) Date of Patent: Apr. 23, 2024

(54) WHEEL SPEED DETECTION SYSTEM

(71) Applicant: Aptiv Technologies AG, Schaffhausen (CH)

(72) Inventors: Martin Bornemann, Nuremberg (DE); Lee Henry Bauer, Birmingham, MI (US); Christian Schäfer, Bochum (DE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/804,699

(22) Filed: May 31, 2022

(65) Prior Publication Data
US 2022/0379857 A1 Dec. 1, 2022

(30) Foreign Application Priority Data

| May 31, 2021 | (EP) | ................................... | 21176944 |
| Feb. 21, 2022 | (EP) | ................................... | 22157813 |

(51) Int. Cl.
| *B60T 8/1755* | (2006.01) |
| *B60R 16/023* | (2006.01) |
| *B60T 8/176* | (2006.01) |
| *B60W 30/02* | (2012.01) |
| *G01P 3/44* | (2006.01) |

(52) U.S. Cl.
CPC ........ *B60T 8/1755* (2013.01); *B60R 16/0231* (2013.01); *B60T 8/176* (2013.01); *B60W 30/02* (2013.01); *G01P 3/44* (2013.01)

(58) Field of Classification Search
CPC ........ B60T 8/1755; B60T 8/176; B60T 8/329; B60R 16/0231; B60W 30/02; G01P 3/44
USPC .......................................................... 701/71
See application file for complete search history.

(56) References Cited

U.S. PATENT DOCUMENTS

| 8,744,652 | B1 | 6/2014 | Nishinaga et al. | |
| 2005/0278107 | A1* | 12/2005 | Disser | B60T 17/043 |
| | | | | 701/76 |
| 2011/0243345 | A1* | 10/2011 | Carreras | G10K 11/17854 |
| | | | | 381/71.6 |
| 2022/0274523 | A1 | 9/2022 | Yoshimasa et al. | |
| 2023/0242085 | A1* | 8/2023 | Beuss | B60T 8/885 |
| | | | | 188/158 |

FOREIGN PATENT DOCUMENTS

EP  3587194  1/2020

OTHER PUBLICATIONS

"Extended European Search Report", EP Application No. 22157813.1, dated Sep. 23, 2022, 9 pages.

* cited by examiner

*Primary Examiner* — Yi-Kai Wang
(74) *Attorney, Agent, or Firm* — Harness, Dickey & Pierce, P.L.C.

(57) ABSTRACT

In some implementations, the system may include a plurality of wheel speed sensors, each of the plurality of wheel speed sensors being configured to monitor the speed of a respective wheel of a vehicle. In addition, the system may include a central electronic control unit. The system may include a plurality of controlling devices, each of the plurality of controlling devices being communicatively coupled to at least one wheel speed sensor of the plurality of wheel speed sensors. Moreover, the system may include a central electronic control unit communicatively coupled to each of the plurality of controlling devices via a network connection and configured to process data received from each of the controlling devices.

20 Claims, 2 Drawing Sheets

WHEEL SPEED DETECTION SYSTEM

INCORPORATION BY REFERENCE

This application claims priority to European Patent Application Number EP22157813.1, filed Feb. 21, 2022, which in turn claims priority to European Patent Application Number EP21176944.3, filed May 31, 2021, the disclosures of which are hereby incorporated by reference in their entireties.

BACKGROUND

Nowadays, almost all vehicles on roads are equipped with Anti-Lock Braking Systems (ABS) or Electronic Stability Programs (ESP). These systems prevent accidents by improving the vehicle stability while braking or stabilizing the driving behavior in critical road conditions.

Both ABS and ESP systems are using wheel speed sensors which are detecting the angular speed of each wheel individually. The angular speed detection is realized by electronic sensors, attached to each wheel of the car, which are detecting a fixed number of pulses per wheel spin. An ABS/ESP Electronic Control Unit (ABS/ESP ECU) is detecting each sensor pulse of each wheel and controls the brake force of each wheel in order to optimize the vehicle stability at any time.

Typical wheel speed sensors within a vehicle are connected directly to the ABS/ESP ECU via individual wires. Such wheel speed sensors which detect a respective wheel rotational speed generate relatively low bandwidth signals, but have latency-critical characteristics. The wheel speed sensors mostly use analog signals with wiring from all four wheels running throughout the vehicle to the ABS/ESP ECU. This has been a reliable solution, but it is expensive regarding materials and challenging regarding diagnosis and repair.

Accordingly, there is a need to have a wheel speed detection system which allows for easy diagnosis and repair and which has reduced requirements regarding material cost.

SUMMARY

The present disclosure provides a wheel speed detection system according to the independent claim. Embodiments are given in the subclaims, the description and the drawings.

In one aspect, the present disclosure is directed at a wheel speed detection system for a vehicle. The system comprises a plurality of wheel speed sensors, wherein each wheel speed sensor is configured to monitor the speed of a respective wheel of the vehicle, a plurality of controlling devices, wherein each controlling device is communicatively coupled to at least one of the wheel speed sensors, and a central electronic control unit communicatively coupled to each of the controlling devices via a network connection and configured to process data received from each of the controlling devices.

Instead of a single central control unit which may be an electronic control unit for Anti-Lock Braking Systems and/or Electronic Stability Programs (ABS/ESP ECU), the wheel speed detection system includes a plurality of controlling devices which are each assigned and coupled to one or more of the wheel speed sensors of the vehicle. Therefore, direct wire connections between a central unit like the ABS/ESP ECU and the wheel speed sensors are not required anymore. The direct wiring which may be part of the vehicle harness is therefore replaced at least partly by the network connection between each of the controlling devices and the central electronic control unit. As a consequence, the vehicle harness may be simplified which reduces material cost.

The controlling devices may be located in different areas of the vehicle and may be used for controlling further devices and functions of the vehicle, i.e., in addition to the wheel speed sensors. The coupling of the controlling devices to the respective wheel speed sensors may be realized either by a wired connection or by a further network connection. Therefore, direct wiring within the wheel speed detection system may be kept at a minimum due to the decentralized architecture of the controlling devices and their network connection to the central electronic control unit. The central electronic control unit performs a preprocessing of the data received from the controlling devices before information based on the signals of the wheel speed sensors is transferred e.g., to the ABS/ESP ECU.

Due to the plurality of controlling devices and their individual coupling and assignment to the respective wheel speed sensors, diagnosis and repair of the wheel speed detection system may be simplified. That is, a diagnosis may be performed based on data received from the individual controlling devices which allows for a simplified and localized detection of failures within the wheel speed detection system which may be related e.g., to an individual wheel speed sensor. As a consequence, the repair following to the diagnosis may also be supported due to the detailed localization of a possible failure.

In summary, the requirements regarding wiring within the vehicle are reduced by the wheel speed detection system while diagnosis and repair are simplified for the wheel speed detection system due to the plurality of controlling devices being coupled and assigned to the wheel speed sensors and having the network connection with the central electronic control unit.

The electronic control unit (ECU) may comprise a processing unit, at least one memory unit and at least one non-transitory data storage. As used herein, the terms electronic control unit and processing unit may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The electronic control unit and the processing unit may include memory (shared, dedicated, or group) that stores code executed by the processor.

The wheel speed detection system may comprise one or more of the following features:

Each of the controlling devices may be assigned to a predetermined zone of the vehicle. The network connection between the central electronic control unit and each of the controlling devices may include a connection via a digital communication bus. Each of the controlling devices and the at least one of the wheel speed sensors may be connected via a wired connection. Alternatively, each of the controlling devices and the at least one of the wheel speed sensors may be connected via a digital communication bus.

The network connection between the central electronic control unit and each of the controlling devices may include a connection via a digital communication bus having a first data transfer rate, each of the controlling devices and the at least one of the wheel speed sensors may be connected via a digital communication bus having a second data transfer rate, and the first data transfer rate may be different from the second data transfer rate. Each of the controlling devices may be connected to a single one of the wheel speed sensors.

Alternatively, at least one of the controlling devices may be connected to at least two wheel speed sensors. Each of the plurality of controlling devices may include a local time base which may be synchronized with a central time base provided by the central electronic control unit. In addition, the local time base of each of the plurality of controlling devices may be periodically synchronized with the central time base.

Each of the plurality of controlling devices may be configured to detect pulses provided by the at least one of the wheel speed sensors, and each of the plurality of controlling devices may generate a network package including a point in time at which the respective controlling device detects one of the pulses and an identifier of the respective wheel speed sensor for which the one of the pulses is detected.

At least one of the plurality of controlling devices may be configured to derive a further quantity from a signal provided by the at least one wheel speed sensor, wherein the further quantity is different from wheel speed. In addition, at least one of the plurality of controlling devices may be configured to control at least one further sensor or device which is different from the wheel speed sensors.

According to an implementation, each of the controlling devices may be assigned to a predetermined zone of the vehicle. Each of the controlling devices may be located in the respective predetermined zone of the vehicle to which it is assigned. Due to this local arrangement of each controlling device, the requirements regarding wiring may further be reduced for the vehicle.

Each predetermined zone may be regarded as a "local" zone and may be a spatially restricted area within the vehicle. For example, the vehicle may include four zones which are related to each of four corners or four wheels of the vehicle. For this example, each controlling device may also be assigned and communicatively coupled to an individual wheel speed sensor detecting the speed of a respective one of the four wheels of the vehicle. Due to the assignment to the predetermined zone and the local arrangement in this zone, the respective controlling device may also be regarded as a zonal controller.

The assignment of the respective controlling device to the predetermined zone or spatially restricted area within the vehicle allows for a localization of the information provided by the respective controlling device and the corresponding one or more of the wheel speed sensors. Therefore, an error or failure of the controlling devices and/or the corresponding wheel speed sensors may be localized accordingly based on the network connection of the individual controlling devices to the central electronic control unit. Hence, the diagnosis of the system may be further simplified due to the zonal assignment of the controlling devices, and the repair may be supported accordingly.

According to another implementation, the network connection between the central electronic control unit and each of the controlling devices may include a connection via a digital communication bus. Such a connection like an Ethernet connection which is based on a standardized networking protocol may allow for the use of standardized electronic components within the central electronic control unit and the controlling devices. This may reduce the cost of the wheel speed detection system.

According to a further implementation, each of the controlling devices and the at least one of the wheel speed sensors may be connected via a wired connection. In this case, common wheel speed sensors may be used for the system while a relatively short wired connection may be required only extending to the localized controlling device instead of the connection to a central unit which would require much longer wired connections.

Alternatively, each of the controlling devices and the at least one of the wheel speed sensors may be connected via a digital communication bus. For this implementation, no wired connection may be required within the wheel speed detection system. This may further simplify the harness of the vehicle.

According to another implementation, the network connection between the central electronic control unit and each of the controlling devices may include a connection via a digital communication bus having a first data transfer rate, and each of the controlling devices and the at least one of the wheel speed sensors may be connected via a digital communication bus having a second data transfer rate. The first data transfer rate may be different from the second data transfer rate. For example, the first data transfer rate may be at least 1 gigabits per second (Gbit/s), while the second data transfer rate may be approximately 100 megabits per second (Mbit/s). That is, a mix of data rates may be used within the wheel speed detection system.

The higher transfer rate between the controlling devices and the central electronic control unit may ensure that the latency time for transferring the signal or information provided by the individual wheel speed sensor to the central electronic control unit may be kept at a minimum, e.g., smaller than 1 ms. This may be relevant for systems in which the controlling devices are zonal controllers of the vehicle which control additional components or devices, i.e., in addition to the wheel speed sensors. On the other hand, a lower transfer rate may be sufficient for the digital communication bus, e.g., an Ethernet connection, connecting between the controlling devices and the individual wheel speed sensor.

According to another implementation, each of the controlling devices may be connected to a single one of the wheel speed sensors. In other words, there may be a one-to-one correspondence between the controlling devices and the wheel speed sensors. This correspondence may further simplify and improve diagnosis and repair of the wheel speed detection system. Alternatively, at least one of the controlling devices may be connected to at least two wheel speed sensors. For example, one zonal controlling device may be connected to the two wheel speed sensors of the vehicle's rear wheels. This may reduce the number of controlling devices which are required for the wheel speed detection system.

According to a further implementation, each of the plurality of controlling devices may include a local time base which is synchronized with a central time base provided by the central electronic control unit. In addition, the local time base of each of the plurality of controlling devices may be periodically synchronized with the central time base. Due to the periodic synchronization, the reliability of the information provided by the wheel speed sensors via the localized controlling devices may be improved.

According to a further implementation, each of the plurality of controlling devices may be configured to detect pulses provided by the at least one of the wheel speed sensors. Each of the plurality of controlling devices may generate a network package including a point in time at which the respective controlling device detects one of the pulses, and an identifier for the respective wheel speed sensor for which the one of the pulses is detected. The transferred network package may therefore comprise minimum information regarding the wheel speed detection, i.e., the point in time provided by the zone local time of the respective controlling device, and the identifier which may be simply a unique sensor number. Hence, the wheel speed detection may have low requirements regarding the network package and the amount of data to be transferred. However, for using standard network protocols, each network package may be extended in order to comprise the number of bytes required for the respective protocol.

At least one of the plurality of controlling devices may be configured to derive a further quantity from a signal provided by the at least one wheel speed sensor. This further quantity may be different from wheel speed and may include a tire pressure. Moreover, at least one of the plurality of controlling devices may be configured to control at least one further sensor or device which is different from the wheel speed sensors. That is, the controlling devices may be configured as multi-functional devices which may reduce the cost of the system in comparison to systems requiring additional devices for controlling individual sensors separately.

In another aspect, the present disclosure is directed at a vehicle comprising a wheel speed detection system as described above.

The vehicle may further comprise an electronic control unit for Anti-Lock Braking Systems and for Electronic Stability Programs (ABS/ESP ECU), and the central electronic control unit may be connected directly to the ABS/ESP ECU. Therefore, direct wire connections between the ABS/ESP ECU and the wheel speed sensors may be generally avoided.

BRIEF DESCRIPTION OF THE DRAWINGS

Example implementations and functions of the present disclosure are described herein in conjunction with the following drawings, showing schematically.

DETAILED DESCRIPTION

Figure 1:
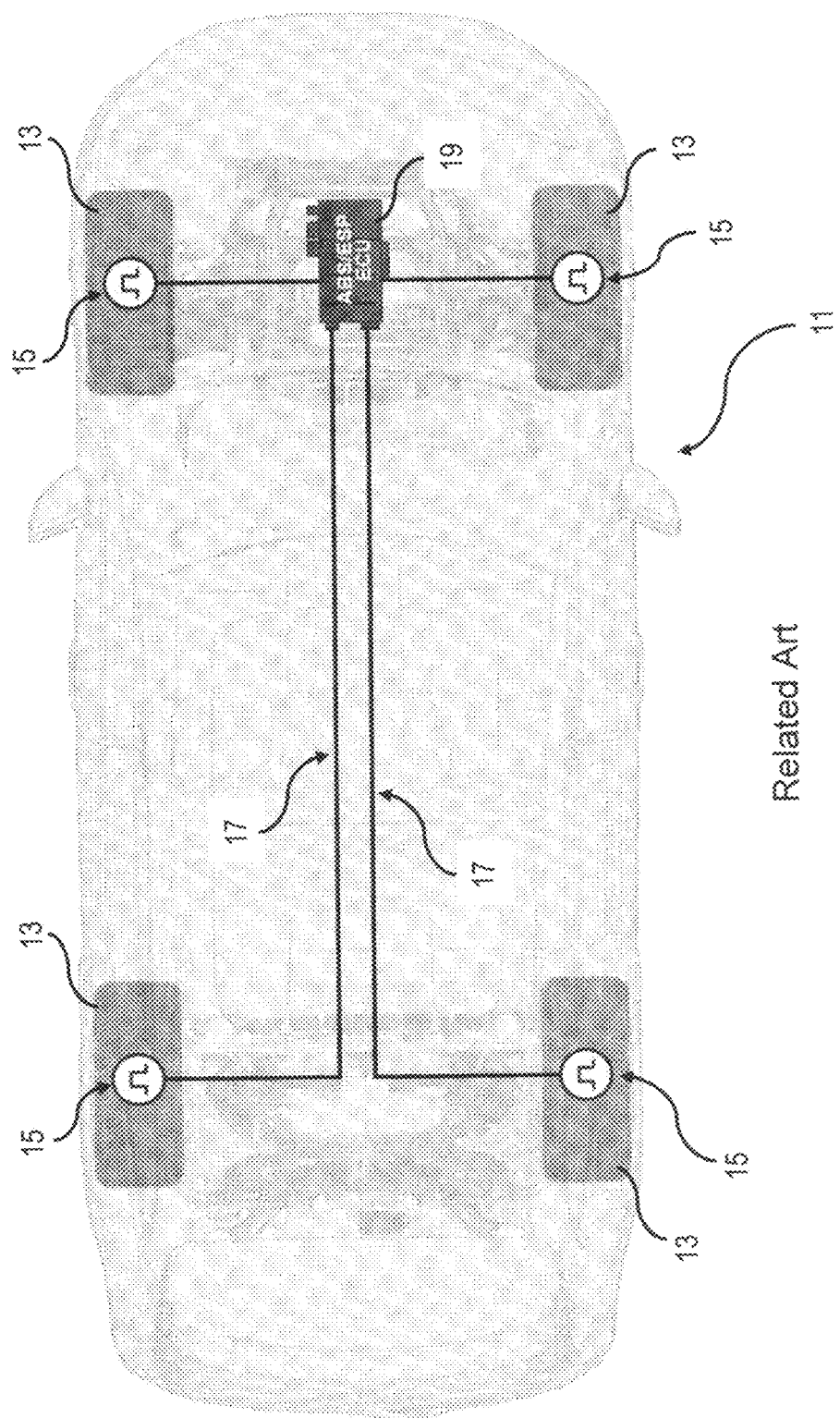
FIG. 1 a vehicle including a wheel speed detection system according to the related art.

FIG. 1 depicts a vehicle 11 which includes a wheel speed detection system according to the related art. The vehicle 11 includes four wheels 13. Each wheel 13 is equipped with a respective wheel speed sensor 15. Each of the four wheel speed sensors 15 has a wired connection 17 which connects the respective wheel speed sensor 15 to an electronic control unit 19 for Anti-Lock Braking Systems (ABS) and/or Electronic Stability Programs (ESP), i.e., to an ABS/ESP ECU 19.

The ABS/ESP ECU 19 receives signals from the respective wheel speed sensors 15 and processes these signals in order to provide information for further components of the vehicle, e.g., components of the ABS and the ESP. Usually, analog signals are provided by the wheel speed sensors 15 for the ABS/ESP ECU 19 via the wired connection 17 which is running throughout the vehicle, e.g., as part of the vehicle's harness. No other electronic control units (ECUs) are involved in the signal chain as shown in FIG. 1 although line connectors may be included in the vehicle's harness. Although the architecture of the wheel speed detection system as shown in FIG. 1 is typically regarded as reliable solution for performing wheel speed detection, the wired connection 17 throughout the entire vehicle is expensive regarding materials and may be challenging regarding diagnosis and repair.

Figure 2:
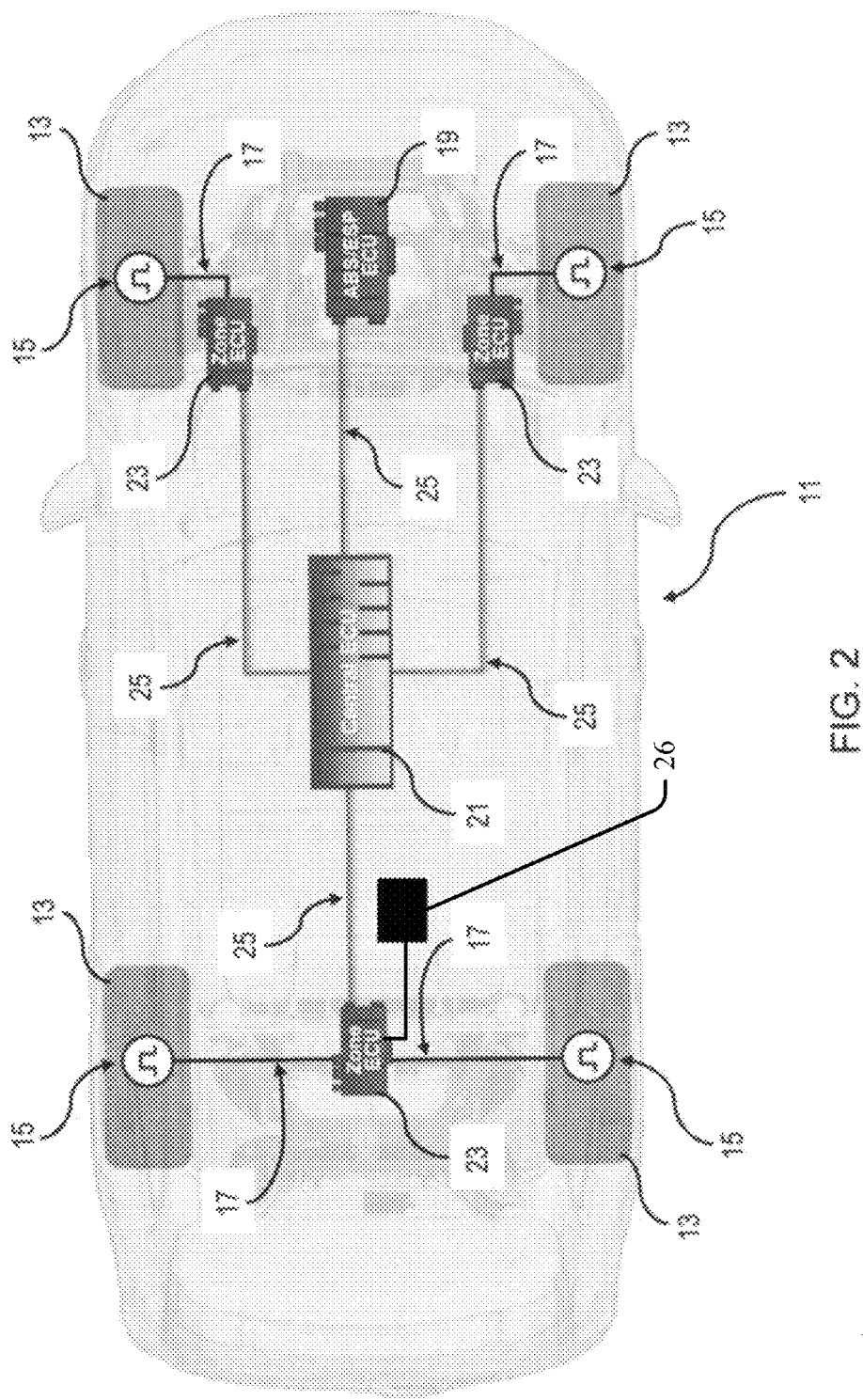
FIG. 2 a vehicle including a wheel speed detection system according to the present disclosure.

FIG. 2 depicts a vehicle 11 which includes a wheel speed detection system according to the present disclosure. Within this system, the use of wired connections 17 is strongly reduced.

In addition to the components as shown in FIG. 1, the wheel speed detection system as shown in FIG. 2 includes a central electronic control unit (central ECU) 21 and controlling devices or zone ECUs 23. Each controlling device or zone ECU 23 is connected to the central ECU 21 via a respective network connection 25. Furthermore, each zone ECU 23 is assigned to and located in a predetermined zone of the vehicle 11. In addition, a network connection 25 is provided between the central ECU 21 and the ABS/ESP ECU 19. In the implementation as shown in FIG. 2, three zone ECUs 23 are provided, each of which is assigned and communicatively coupled to at least one of the wheel speed sensors 15. In detail, two zone ECUs 23 are respectively assigned and coupled to a single wheel speed sensor 15, i.e., to the respective wheel speed sensor 15 belonging to the right and left front wheels 13, respectively, of the vehicle 11. In contrast, a further zone ECU 23 is assigned and coupled to two wheel speed sensors 15, i.e., to the wheel speed sensors 15 belonging to the right and left rear wheels 13, respectively, of the vehicle 11.

The coupling of the zone ECUs 23 to the respective wheel speed sensors 15 is realized by respective wired connections 17. The signal received by the respective zone ECU 23 from the wheel speed sensors 15 via the wired connection 17 are preprocessed in the respective zone ECU 23. In detail, a fixed number of pulses per wheel spin is detected by the respective wheel speed sensor 15, and these pulses are acquired as analog signals by the respective zone ECU 23. The respective zone ECU or controlling device 23 generates a network package for each of the pulses. Such a network package includes a point in time at which the respective zone ECU 23 detects one of the pulses, and an identifier, i.e., a unique sensor number, of the respective wheel speed sensor 15 for which the respective pulse is detected.

The network connection 25 includes a connection via a digital communication bus and is configured as an Ethernet connection in order to transfer the network package from the respective zone ECU 23 to the central ECU 21. The central ECU 21 further processes the network packages which are received from the respective zone ECUs 23 in order to provide information regarding the wheel speed, for example in revolutions per minute, for each of the individual wheels 13 of the vehicle 11. This information regarding the individual wheel speeds is transferred from the central ECU 21 to the ABS/ESP ECU 19 via a further network connection 25 which is also configured as an Ethernet connection.

For a proper processing of the network packages which are received by the central ECU 21 from the respective zone ECUs 23, a synchronization is required between the central ECU 21 and all zone ECUs 23. In detail, the central ECU 21 provides a central time base to which a local time base being used by the respective zone ECUs 23 is periodically synchronized. In order not to influence the ABS/ESP algorithms in the ABS/ESP ECU 19, the maximum allowed time difference between a central master clock of the central ECU 21 and a respective clock reference in each of the zone ECUs 23 is smaller than a predefined threshold. For example, the time difference should be significantly less than 100 μs.

For performing the synchronization, clock control packages are transferred periodically from the central ECU 21 to the respective zone ECUs 23. The clock control packages include a respective timestamp which is provided by the central master clock of the central ECU 21 and used for the synchronization by the respective zone ECUs 23. The time required for transferring the respective clock control package from the central ECU 21 to each of the zone ECUs 23 is measured once and assumed to be constant during operation of the entire system. This transfer time of the respective clock control package is taken into consideration for the synchronization of the respective zone ECU 23. In summary, the maximum allowed time difference refers to a maximum tolerable deviation between the central time base of the central ECU 21 and the respective local time base of the zone ECUs 23.

For an alternative implementation which is not shown in FIG. 2, the wired connections 17 between the wheel speed sensors 15 and the respective zone ECUs 23 may be replaced by further network connections 25, i.e., by respective Ethernet connections between the wheel speed sensors 15 and the zone ECUs 23. For these network or Ethernet connections 25 between the wheel speed sensors 15 and the zone ECUs 23, a data transfer rate of 100 Mbit/s may be provided, whereas the typical transfer rate of the Ethernet connections 25 between the zone ECUs 23 and the central ECU 21 may be at least 1 Gbit/s.

The higher data transfer rate of the network connection between the zone ECUs 23 and the central ECU 21 ensures a proper transmission of the network packages from the zone ECUs 23 to the central ECU 21 without increasing a latency time for transferring the wheel speed information from the wheel speed sensors 15 to the central ECU 21. In detail, such a latency time should be less than 1 ms. For the wheel speed detection system as shown in FIG. 2, i.e., having the wired connections between the wheel speed sensors 15 and the zone ECUs 23, and for the wheel speed detection system according to the alternative implementation having Ethernet connections between the wheel speed sensors 15 and the zone ECUs 23, a maximum delay in a range less than 1 ms has been observed for transferring wheel speed information, i.e., pulses from the wheel speed sensors 15, to the ABS/ESP ECU 19 by using a suitable test arrangement.

In a further alternative implementation, each of the wheel speed sensors 15 may be assigned to a respective zone ECU 23 such that in the vehicle 11 as shown in FIG. 2, four zone ECUs 23 would be provided. In other words, there is a one-to-one correspondence between the zone ECUs 23 and the wheel speed sensors 15 or wheels 13 for this implementation. Furthermore, each of the zone ECUs 23 may be physically located within one of the four zones of the vehicle 11.

In addition, at least one of the zone ECUs 23 may also be configured to derive a further quantity which is different from wheel speed, e.g., the pressure of the tire belonging to the wheel 13 at which this wheel speed sensor 15 is installed, from a signal provided by the respective wheel speed sensor 15. Moreover, the zone ECUs 23 may further be configured to control at least one further sensor or device which is different from the wheel speed sensors 15. For example, the zone ECUs 23 may be connected to a respective radar sensor (not shown) which is installed in the respective zone or area to which the respective ECU 23 is assigned. That is, the ECUs 23 may be configured as multifunctional devices being able to control a plurality of sensors or further devices 26 which are installed in the same zone of the vehicle 11 as the respective ECU 23.

In summary, the requirements regarding wired connections 17 are reduced for the implementation as shown in FIG. 2 and for alternative implementations using network connections 25 only. Hence, the vehicle's harness can be simplified which reduces material cost. In addition, diagnosis and repair is simplified for the wheel speed detection system as shown in FIG. 2 due to the zone ECUs 23 which are assigned to a restricted spatial area within the vehicle 11. In detail, due to the network packages it is known for the central ECU 21 from which of the respective zone ECUs 23 and from which of the wheel speed sensors 15 the network package under consideration is provided. This helps to localize any error or failure which is detected in the signals from the wheel speed sensors 15.

What is claimed is:

1. A system comprising:
  a plurality of wheel speed sensors, each of the plurality of wheel speed sensors being configured to monitor the speed of a respective wheel of a vehicle;
  a central electronic control unit;
  a plurality of controlling devices, each of the plurality of controlling devices being communicatively coupled to at least one wheel speed sensor of the plurality of wheel speed sensors; and
  a central electronic control unit communicatively coupled to each of the plurality of controlling devices via a network connection and configured to process data received from each of the controlling devices,
  wherein each of the plurality of controlling devices includes a local time base that is periodically synchronized with a central time base provided by the central electronic control unit such that a maximum time difference between the central time base and each local time base is smaller than a predefined threshold.

2. The system according to claim 1, wherein each of the plurality of controlling devices are assigned to a pre-determined zone of the vehicle.

3. The system according to claim 1, wherein the network connection between the central electronic control unit and each of the controlling devices includes a connection via a digital communication bus.

4. The system according to claim 1, wherein each of the plurality of controlling devices being communicatively coupled to the at least one wheel speed sensor of the plurality of wheel speed sensors is connected via a wired connection.

5. The system according to claim 1, being communicatively coupled to the at least one wheel speed sensor of the plurality of wheel speed sensors is connected via a digital communication bus.

6. The system according to claim 1, wherein:
  the network connection between the central electronic control unit and each of the plurality of controlling devices includes a connection via a digital communication bus having a first data transfer rate;
  each of the plurality of controlling devices and the at least one wheel speed sensor of the plurality of wheel speed sensors is connected via a digital communication bus having a second data transfer rate; and
  the first data transfer rate is different from the second data transfer rate.

7. The system according to claim 1, wherein each of the plurality of controlling devices is connected to a single one of the wheel speed sensors.

8. The system according to claim 1, wherein at least one of the of the plurality of controlling devices is connected to at least two wheel speed sensors.

9. The system according to claim 1, wherein each of the plurality of controlling devices are configured to detect pulses provided by the at least one wheel speed sensor of the plurality of wheel speed sensors.

10. The system according to claim 9, wherein each of the plurality of controlling devices generate a network package including a point in time at which a respective controlling device detects one of the pulses and an identifier of the respective wheel speed sensor for which the one of the pulses is detected.

11. The system according to claim 1, wherein one or more the plurality of controlling devices are configured to derive a further quantity from a signal provided by the at least one wheel speed sensor, wherein the further quantity is different from wheel speed.

12. The system according to claim 1, wherein one or more of the plurality of controlling devices are configured to control a second sensor.

13. A vehicle comprising:
- a plurality of wheel speed sensors, each of the plurality of wheel speed sensors being configured to monitor the speed of a respective wheel of a vehicle;
- a central electronic control unit; and
- a plurality of controlling devices, each of the plurality of controlling devices being communicatively coupled to at least one wheel speed sensor of the plurality of wheel speed sensors, the central electronic control unit communicatively coupled to each of the plurality of controlling devices via a network connection and configured to process data received from each of the controlling devices,
- wherein each of the plurality of controlling devices includes a local time base that is periodically synchronized with a central time base provided by the central electronic control unit such that a maximum time difference between the central time base and each local time base is smaller than a predefined threshold.

14. The vehicle according to claim 13, further comprising an Anti-Lock Braking System and for Electronic Stability Programs electronic control unit (ABS/ESP ECU).

15. The vehicle according to claim 14, wherein the central electronic control unit is directly connected to the ABS/ESP ECU.

16. The vehicle according to claim 15, wherein the connection between the central electronic control unit and the ABS/ESP ECU is a wired connection.

17. The vehicle according to claim 13, wherein each of the plurality of controlling devices are assigned to a pre-determined zone of the vehicle.

18. The vehicle according to claim 13, wherein the network connection between the central electronic control unit and each of the controlling devices includes a connection via a digital communication bus.

19. The vehicle according to claim 13,
- wherein the network connection between the central electronic control unit and each of the plurality of controlling devices includes a connection via a digital communication bus having a first data transfer rate,
- wherein each of the plurality of controlling devices and the at least one wheel speed sensor of the plurality of wheel speed sensors is connected via a digital communication bus having a second data transfer rate, and
- wherein the first data transfer rate is different from the second data transfer rate.

20. The vehicle according to claim 13, wherein each of the plurality of controlling devices are configured to detect pulses provided by the at least one wheel speed sensor of the plurality of wheel speed sensors.

* * * * *